Jan. 18, 1955 S. DALE 2,699,899
GRINDER AND DISPENSER FOR COFFEE AND THE LIKE
Filed May 17, 1951 2 Sheets-Sheet 1
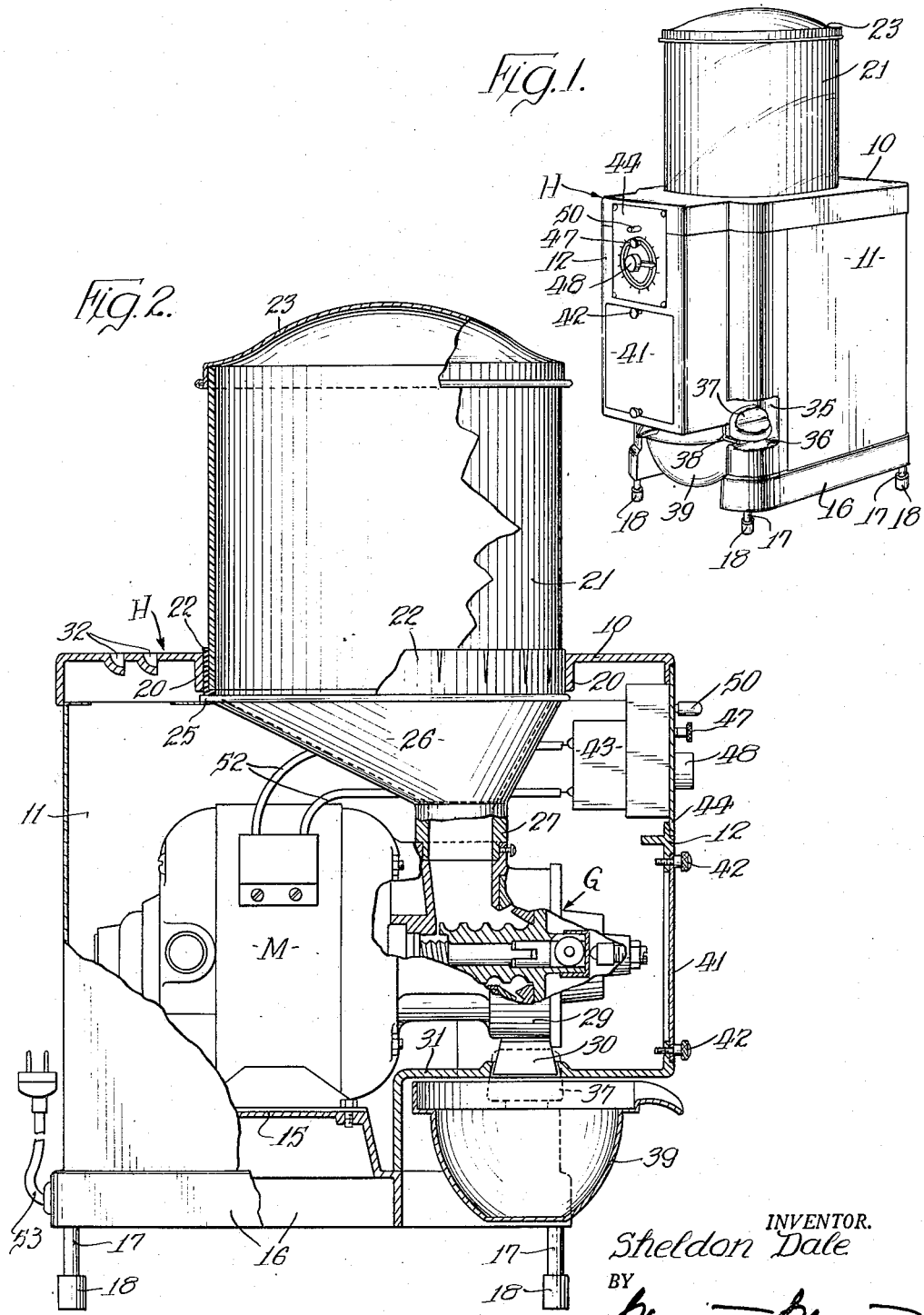
INVENTOR.
Sheldon Dale
BY
Attys.

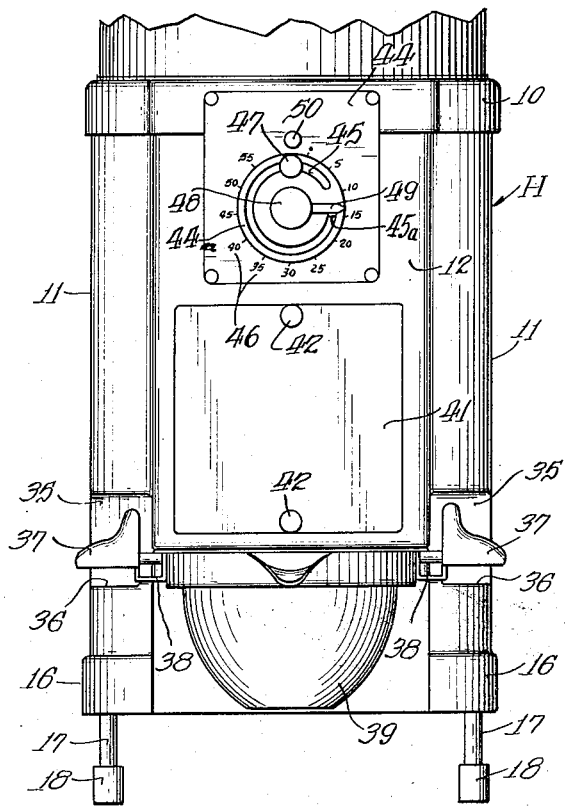
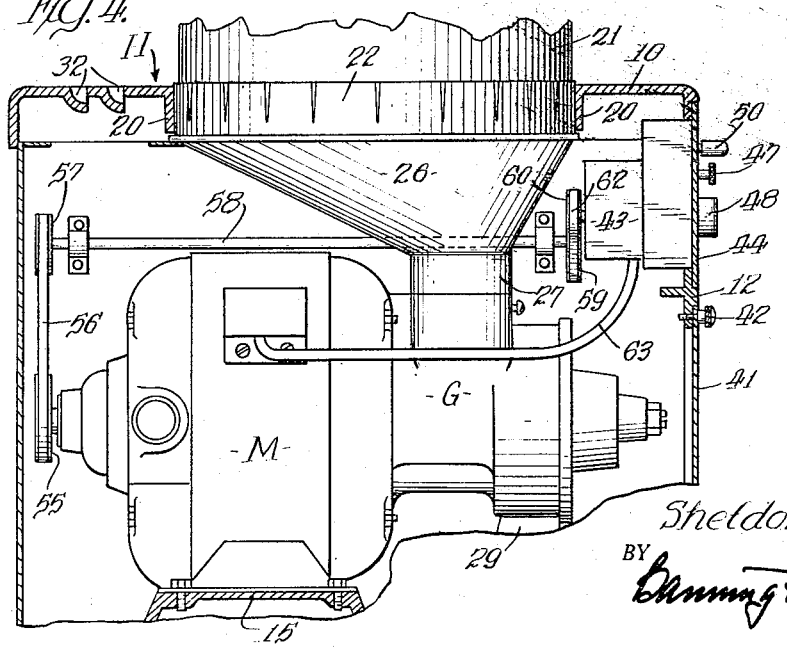

United States Patent Office 2,699,899
Patented Jan. 18, 1955

2,699,899

GRINDER AND DISPENSER FOR COFFEE AND THE LIKE

Sheldon Dale, Chicago, Ill., assignor to Cory Corporation, Chicago, Ill., a corporation of Delaware Application May 17, 1951, Serial No. 226,898

2 Claims. (Cl. 241—100)

This invention relates to a combination grinder and dispenser for coffee and the like, and to a novel and improved arrangement of the operating units which are incorporated therein, and also to the means for controlling operation of the grinder-dispenser whereby a predetermined amount of coffee or the like is ground and dispensed each time.

The present apparatus is designed particularly for use in establishments where coffee beverage is prepared and served to a large number of customers throughout the day. It is highly important that the coffee beans be freshly ground in order that the infusion produced therefrom may be most pleasing to the taste. At the same time the operation of grinding the coffee should be simplified as much as possible, and it is important that the amount of coffee ground and dispensed with each operation should be accurately predetermined. The present apparatus has been designed particularly to meet these various objectives in a satisfactory and dependable way.

A suggestive embodiment of this invention is illustrated in the accompanying drawings wherein:

Figure 1 is a view in perspective of the housing wherein the grinder-dispenser is contained;

Fig. 2 is a vertical section through the housing, taken in a central plane extending from front to rear;

Fig. 3 is a front elevation of the housing; and

Fig. 4, which is a fragmentary vertical section in the same plane as Fig. 2, shows a modification.

As herein illustrated, I provide a housing H having a top 10, sides 11 which are inset to join with a front 12 of reduced width, and an interior platform 15 whereon is mounted an operating unit comprising a motor M in connection with a conventional grinder G. Below the platform the housing sides are extended in the form of parallel bases 16 in each of which, near opposite ends thereof, is a socket (not shown) for receiving the threaded upper end of a leg 17 having a cushion foot 18. It is contemplated that the several legs will replace other smaller rubber cushions, otherwise used, in order to provide sufficient space for a taller receiving cup of a larger capacity whenever necessary.

A large circular opening with a depending marginal wall 20 is provided in the housing top 10. Fitted into this top opening is the lower position of a cylindrical hopper 21, desirably of a transparent plastic material whereby to afford a view of its interior. A resilient gasket 22 which is fitted between the hopper and the circular wall 20 assures a tight connection therebetween. This gasket also extends inwardly to underlie the hopper bottom. A removable cover 23 is applied over the open top of the hopper 21, and the gasket-covered bottom end of the hopper is rested upon a ledge 25 which extends around the upper end of a chute 26 whose walls taper inwardly and downwardly to terminate in a neck 27 which is interfitted with and affixed to an upwardly facing inlet which upstands from the grinder G.

The mechanism thus far described provides a bottomless hopper 21 for containing a supply of coffee or the like which is gravity-fed through the chute 26 into the grinder G that is operated by the motor M. Discharge of the ground material takes place from an outlet 29 at the undersides of the grinder and thence through a short extension 30 whose open bottom is exposed through an opening in a floor 31 that is located at an elevated point at the narrow front of the housing. Louvers 32 may be provided in the housing top 10, rearwardly of the hopper 21, to promote ventilation interiorly thereof.

The housing sides 11, at the point of inset where they join with the narrow front 12, are each notched at 35 whereby to provide a pair of oppositely disposed ledges 36 for the support of a pair of outwardly extended handles 37 that are carried by brackets 38 upstanding from a bowl-like cartridge 39 wherein the ground coffee is to be deposited. Such a cartridge is well known at the present time, being one of the units that is comprised in the automatic commercial coffee brewer disclosed in Letters Patent No. 2,551,219 dated May 1, 1951.

When the handles are rested on the ledges 36, the cartridge bowl will be sustained in an upright position to receive coffee from the grinder G discharged through the open mouth of the delivery duct thereabove. Instead of suspending a coffee-receiving bowl from the ledges 36, any suitable container—a glass or cup, for example—may be rested on the same counter as that which supports the housing, and when positioned at the housing front, between its sides 11, will lie directly below the discharge end of the delivery duct 30 so as to receive the material flowing therefrom.

The housing front 12 is provided with a large aperture that is covered by a plate 41 removably secured in place by screws 42. When this plate is taken off, access is afforded to the housing interior at a point oppositely of the axis of the motor-grinder unit thereby to facilitate any adjustments or servicing thereof. There is also formed in the housing front a second aperture to receive a timer unit 43 having a plate 44 providing a closure for the aperture. Means are provided to secure this unit fixedly in place. Constituting part of the closure 44 and rotatable relative thereto is a dial plate 44a formed with a slot 45 extending circularly for nearly 360° (see Fig. 3) to receive a stationary member in the form of a lock screw 47 which when tightened will retain the dial plate 44a fixedly in any position of angular adjustment. This lock screw 47 also serves as one terminal of a motor-arresting switch. A rotatable knob 48 arranged coaxially of the slot and the dial 44a is rotated in response to operation of the timer and a movable member in the form of a radial finger 49 connected fast with the knob will engage the lock screw when the knob is rotated the necessary distance for the purpose. The finger 49 constitutes the other terminal of the motor-arresting switch, the motor being arrested when the finger 49 makes contact with the lock screw 47. Through the medium of a lug 45a at one end of the slot 45, the finger 49 is, when in its initial position in abutment with the lug, removed the desired distance from the lock screw 47. A switch button 50 projects from the timer dial plate 44 and, when manually operated, will close the circuit carried by electrical conductors 52 and 53 between the motor M and a current source. In the ensuing operation of the motor-grinder unit, the radial finger 49 will be rotated around to the point of engaging the lock screw 47 whereby to operate a switch comprised in the timer and break the circuit and cause stopping of the motor M and its associated grinder G. The period of operation is determined by the setting of the dial plate 44a relative to the lock screw 47, the time being reduced when its position is shifted toward the lock screw, and vice-versa. To facilitate setting the dial 44a, the plate 44 is formed with graduations adjacent the periphery of the dial. Herein these graduations represent the approximate number of cups of coffee that can be made from the coffee that will be ground with that particular setting. The radial finger 49 will automatically be reset to the zero position at the conclusion of the operating cycle. Such an electrical unit for adjustably controlling the period of operation of a motor is well known, so need not be further described here.

In Fig. 4 the motor M is shown as equipped with a pulley 55 from which a belt 56 is driven to rotate a pulley 57 that is mounted fast on a shaft 58 which carries a second pulley 59 adjacent a pulley 60 on the timer 43. An endless belt 62 is trained over the pulleys 59 and 60 so that the time control mechanism comprised in the timer 43 will be operated to maintain intact the electrical circuit 63 to the motor M for a preselected period of time. In this case, operating power for the time control mechanism is transmitted mechanically from the motor, as distinguished from electrical power that is utilized for the timer of Figs. 1-3. The knob-setting device in the timer of Fig. 4 may be the same as that already described.

The assembly of units in the housing, as herein disclosed, is very advantageous because of simplicity, accessibility, and demountability. The hopper, in particular, is supported in a gasketed mounting from which it may readily be removed for purposes of cleansing or otherwise. When replaced, the hopper is in sealing connection with the chute so that beans of coffee or the like passing therethrough cannot yield up any particles to contact with the exterior of the motor-grinder unit therebelow. Furthermore, the support for the container to receive the ground material is such that the container is accommodated within the confines of the housing so as to be fully protected during the grinding operation; in fact, the container may be left in place temporarily on its support with full assurance that nothing can drop into it to spoil the grounds already received therein.

I claim:

1. In combination with a motor-grinder unit operating about a horizontal axis and having an upwardly facing material inlet and a downwardly facing discharge outlet, a housing enclosing the motor-grinder unit and provided with means affording a mounting therefor, the housing top being formed with a large opening having a depending marginal flange, a bottomless hopper fitted into the opening, the marginal flange about said opening lending added support to said hopper, and a chute joined to the material inlet of the motor-grinder unit and extending upwardly therefrom to be supported thereby, the walls of the chute being flared outwardly to substantially the contour and size of the flanged top opening and providing at their upper margins a base whereon the lower end of the hopper walls may be supported, and a resilient gasket extending between the hopper and the surrounding flange of the opening and between the upper margins of the chute walls and the lower end of the hopper walls to establish a sealing connection at such points.

2. In combination with a motor-grinder unit operating about a horizontal axis and having an upwardly facing loose material inlet and a downwardly facing ground material discharge outlet, a housing enclosing the motor-grinder unit nd provided with means affording a mounting therefor, the housing top being formed with an opening, a bottomless hopper fitted into the opening, a chute joined to the material inlet of the motor-grinder unit and extending upwardly therefrom to be supported thereby, the walls of the chute providing at their upper margins a base whereon the lower end of the hopper walls may be supported, the housing being extended below the discharge outlet of the motor-grinder unit and inset therebelow on one face to expose the said discharge outlet, and a pair of supports on the housing below the discharge outlet and on opposite sides thereof for sustaining thereon a receptacle therebetween in position entirely beneath he housing to receive ground material from the discharge outlet.

References Cited in the file of this patent

UNITED STATES PATENTS

| 786,151 | Ribert | Mar. 28, 1905 |
| 2,187,102 | Schuhmann | Jan. 16, 1940 |
| 2,203,672 | Chester | June 11, 1940 |
| 2,212,883 | Meeker | Aug. 27, 1940 |
| 2,550,281 | Martin | Apr. 24, 1951 |

FOREIGN PATENTS

| 299,446 | Italy | Aug. 2, 1932 |
| 755,738 | France | Nov. 29, 1933 |